US009686973B2

(12) United States Patent
Nolen et al.

(10) Patent No.: US 9,686,973 B2
(45) Date of Patent: Jun. 27, 2017

(54) METHODS, APPARATUS AND COMPOSITIONS FOR ABATEMENT OF BEDBUGS

(75) Inventors: James Nolen, West Greenwich, RI (US); Robert G. Nelson, Thompson, CT (US)

(73) Assignee: BIOSENSORY, INC., Putnam, CT (US)

( * ) Notice: Subject to any disclaimer, the term of this patent is extended or adjusted under 35 U.S.C. 154(b) by 141 days.

(21) Appl. No.: 12/316,007

(22) Filed: Dec. 9, 2008

(65) Prior Publication Data

US 2009/0145019 A1    Jun. 11, 2009

Related U.S. Application Data

(60) Provisional application No. 61/007,109, filed on Dec. 11, 2007.

(51) Int. Cl.
*A01M 1/10* (2006.01)
*A01M 1/02* (2006.01)

(52) U.S. Cl.
CPC ............ *A01M 1/023* (2013.01); *A01M 1/026* (2013.01); *A01M 1/103* (2013.01)

(58) Field of Classification Search
CPC .......... A01M 1/00; A01M 1/02; A01M 1/023; A01M 1/026; A01M 1/10; A01M 1/103
(Continued)

(56) References Cited

U.S. PATENT DOCUMENTS 2,167,978 A * 8/1939 Jennerich ............ A01M 1/2005
43/121
4,171,340 A    10/1979 Nishimura et al.
(Continued)

OTHER PUBLICATIONS

Barrozo, Romina B. et al., "Orientation Behavior of the Blood-sucking Bug Triatoma infestans to Short-chain Fatty Acids: Synergistic Effect of L-Lactic Acid and Carbon Dioxide", Chemical Senses, vol. 29, No. 9, pp. 833-841 (2004).
(Continued)

*Primary Examiner* — Darren W Ark
(74) *Attorney, Agent, or Firm* — Dentons US LLP

(57) ABSTRACT

The present invention is directed to an apparatus for monitoring or abatement of bedbugs, comprising: a base having a mounting portion and a control portion; a heating source positioned on the mounting portion; two capture channels positioned proximate to the heating source and adjacent to the base and each comprising a sloped portion; a horizontal portion connected to the sloped portion, the horizontal portion having a width ranging from about 8 to about 15 millimeters; and a channel portion connected to the horizontal portion by a curved portion having a radius of curvature ranging from about $\frac{1}{8}^{th}$ inch to about ½ inch; an insect attractant source positioned on the heating source; a carbon dioxide source attached to the base and capable of emitting carbon dioxide proximate to the heating source, and a control circuit mounted in the control portion and in communication with the heating source and the carbon dioxide source to control operation of the apparatus, wherein the control circuit controls emission of the carbon dioxide and wherein the control circuit controls the heating source to maintain a temperature ranging from 90 to 125° F.

41 Claims, 8 Drawing Sheets

(58) Field of Classification Search
USPC .......................................... 43/123, 107, 121
See application file for complete search history.

(56) References Cited

U.S. PATENT DOCUMENTS

| | | | | |
|---|---|---|---|---|
| 5,189,830 | A * | 3/1993 | Montemurro | 43/121 |
| 5,274,950 | A * | 1/1994 | Roberts | 43/121 |
| 5,657,576 | A * | 8/1997 | Nicosia | 43/107 |
| 5,771,628 | A * | 6/1998 | Nobbs | 43/121 |
| 5,792,467 | A | 8/1998 | Emerson et al. | |
| 5,799,436 | A | 9/1998 | Nolen et al. | |
| 5,926,997 | A * | 7/1999 | Wilcox | 43/121 |
| 5,926,999 | A * | 7/1999 | Vernon et al. | 43/121 |
| 6,055,766 | A | 5/2000 | Nolen et al. | |
| 6,088,949 | A * | 7/2000 | Nicosia et al. | 43/107 |
| 6,146,870 | A | 11/2000 | Grieve et al. | |
| 6,362,235 | B1 | 3/2002 | Nolen et al. | |
| 6,467,215 | B1 * | 10/2002 | Nelson et al. | 43/107 |
| 6,509,354 | B1 | 1/2003 | Toriyabe et al. | |
| 6,518,266 | B1 | 2/2003 | Dhanoa et al. | |
| 6,660,775 | B2 | 12/2003 | Nolen et al. | |
| 6,750,256 | B1 | 6/2004 | Crandall, Jr. et al. | |
| 6,866,858 | B2 | 3/2005 | Nolen et al. | |
| 6,912,815 | B1 | 7/2005 | Koehler et al. | |
| 6,920,716 | B2 * | 7/2005 | Kollars et al. | 43/107 |
| 7,271,706 | B2 * | 9/2007 | Lee | 43/107 |
| 7,299,587 | B1 * | 11/2007 | Metcalfe | 43/121 |
| 7,343,710 | B2 * | 3/2008 | Metcalfe | 43/121 |
| 7,385,483 | B2 * | 6/2008 | Lee | 43/107 |
| 7,591,099 | B2 * | 9/2009 | Lang et al. | 43/107 |
| 7,743,552 | B2 * | 6/2010 | Borth et al. | 43/132.1 |
| 7,905,048 | B2 * | 3/2011 | Borth | A01M 1/103 43/132.1 |
| 8,402,690 | B2 * | 3/2013 | Schneidmiller | A01M 1/103 43/121 |
| 8,635,807 | B2 * | 1/2014 | Frisch | A01M 1/023 43/123 |
| 8,661,728 | B2 * | 3/2014 | Borth | A01M 1/103 43/132.1 |
| 8,904,701 | B2 * | 12/2014 | Vasudeva | A01M 1/023 43/123 |
| 8,966,812 | B2 * | 3/2015 | McKnight | A01M 1/023 43/123 |
| 8,973,300 | B1 * | 3/2015 | Smith | A01M 1/023 43/121 |
| 9,386,763 | B2 * | 7/2016 | Vasudeva | A01M 1/103 |
| 2002/0011020 | A1 | 1/2002 | Nelson et al. | |
| 2002/0119175 | A1 | 8/2002 | Nolen et al. | |
| 2002/0127258 | A1 | 9/2002 | Nolen et al. | |
| 2003/0070345 | A1 * | 4/2003 | Nolen et al. | 43/112 |
| 2003/0158267 | A1 | 8/2003 | Nolen et al. | |
| 2004/0103579 | A1 | 6/2004 | Nolen et al. | |
| 2005/0025357 | A1 | 2/2005 | Landwehr | |
| 2005/0138858 | A1 * | 6/2005 | Lyng | 43/121 |
| 2006/0016120 | A1 * | 1/2006 | Masters et al. | 43/107 |
| 2006/0035985 | A1 | 2/2006 | Nolen et al. | |
| 2006/0042155 | A1 | 3/2006 | Nolen | |
| 2006/0150470 | A1 * | 7/2006 | Ronnau | 43/107 |
| 2007/0044372 | A1 | 3/2007 | Lang et al. | |
| 2007/0169401 | A1 * | 7/2007 | Chyun | 43/107 |
| 2008/0148624 | A1 | 6/2008 | Borth et al. | |
| 2009/0145020 | A1 * | 6/2009 | McKnight | 43/123 |
| 2009/0223115 | A1 * | 9/2009 | Lang et al. | 43/123 |
| 2009/0260276 | A1 * | 10/2009 | Kirsch et al. | 43/123 |
| 2010/0223837 | A1 * | 9/2010 | Borth et al. | 43/123 |
| 2011/0041385 | A1 * | 2/2011 | Faham et al. | 43/123 |
| 2011/0047860 | A1 * | 3/2011 | Black et al. | 43/123 |
| 2011/0072712 | A1 * | 3/2011 | Black | A01M 1/02 43/123 |
| 2011/0203159 | A1 * | 8/2011 | McKnight | A01M 1/023 43/123 |
| 2012/0151823 | A1 * | 6/2012 | Donoho | A01M 1/103 43/123 |
| 2012/0204477 | A1 * | 8/2012 | Fairleigh | A01M 1/103 43/121 |
| 2013/0047495 | A1 * | 2/2013 | Frisch | A01M 1/10 43/123 |
| 2013/0180162 | A1 * | 7/2013 | Vasudeva | A01M 1/103 43/123 |
| 2013/0219771 | A1 * | 8/2013 | Black | A01M 1/02 43/123 |

OTHER PUBLICATIONS

Barrozo, Romina B., et al., "The Response of the Blood-sucking Bug Triatoma infestans to Carbon Dioxide and other Host Odours", Chemical Senses, vol. 29, No. 4, pp. 319-329 (2004).

Cimex Science, "How was your stay?", Advertisement @ www.cimexscience.com, 2 Pages (Oct. 2008).

* cited by examiner

METHODS, APPARATUS AND COMPOSITIONS FOR ABATEMENT OF BEDBUGS

CROSS-REFERENCE TO RELATED APPLICATIONS

This application claims the benefit of U.S. Provisional Patent Application Ser. No. 61/007,109 filed Dec. 11, 2007.

BACKGROUND OF THE INVENTION

1. Field of the Invention

The present invention relates generally to methods and apparatuses for attracting and destroying insects, and more particularly to methods and apparatuses that effectively attract and destroy bed bugs.

2. Brief Description of the Related Art

Bedbugs (or bed bugs) are small nocturnal insects of the family Cimicidae that live by hematophagy, that is by feeding on the blood of humans and other warm-blooded hosts. The common bedbug (*Cimex lectularius*) is the best adapted to human environments. It is found in temperate climates throughout the world and has been known since ancient times. When it feeds, the bug pierces the skin and withdraws the blood of its host. The bites cannot usually be felt until some minutes or hours later, as a dermatological reaction to the injected agents.

There are several means by which dwellings can become infested with bedbugs. People can often acquire bedbugs at hotels, motels, and bed-and-breakfasts, as a result of increased domestic and international tourism, and bring them back to their homes in their luggage. They also can pick them up by inadvertently bringing infested furniture or used clothing to their household. Bedbugs may also travel between units in multi-unit dwellings, such as condominiums and apartment buildings, after being originally brought into the building by one of the above routes. This spread between units is dependent in part on the degree of infestation, on the material used to partition units (concrete is a more effective barrier to the spread of the infestation), and whether infested items are dragged through common areas while being disposed of, resulting in the shedding of bedbugs and bedbug eggs while being dragged.

During the daytime, bedbugs tend to stay out of the light, preferring to remain hidden in such places as mattress seams, mattress interiors, bed frames, nearby furniture, carpeting, baseboards, inner walls, tiny wood holes, or bedroom clutter. Bedbugs are very often found in beds, usually either in the seams of a mattress (usually the seams closest to the sleeper such as those on the edging of a mattress or box spring), in the boxspring, or within the structure of the bed itself. They can also be found in a wide variety of locations in a home, such as behind baseboards, behind a picture frame, within books (near the bed), in telephones, or radios near the bed, and within the folds of curtains.

In previous years, bedbug infestations were treated with chemicals. For example, the widespread use of DDT in the 1940s and 1950s was very effective in eradicating bedbugs from North America. Infestations remained common in many other parts of the world, however, and in recent years have begun to rebound in North America. Reappearance of bedbugs in North America has presented new challenges for pest control and, without DDT and similarly banned agents, no fully effective treatment is now in use. Another reason for recent increases in bedbug infestations is that pest control services today more often use low toxicity gel-based pesticides for control of cockroaches, the most common pest in structures, instead of residual sprays. However, gel-based insecticides primarily used today do not have any effect on bedbugs, as they are incapable of feeding on these baits. In any case, such treatments are costly and can put the homeowner out of the home for extended periods of time. Most professionals claim that it takes several treatments in order to be fully rid of the infestation. However, without being fully rid of the infestation, the bed bugs will just lay more eggs and continue to re-infest the home or other dwelling.

Several devices for treatment of bedbug infestations are known. U.S. Patent Application Publication 2007/0044372 discloses a bedbug monitoring device that attracts bed bugs, and retains the bed bugs or records their passage through the trap using an adhesive on a substrate. However, this device is intended to monitor the presence or absence of bedbugs, and does not provide a means for abating the presence of bedbugs.

U.S. Patent Application Publication 2008/0148624 to Borth et al. discloses a bedbug monitoring device that detects chemicals (e.g., nitrophorin) that are indicative of the presence of bedbugs.

A suitcase-sized device for monitoring the presence or absence of bedbugs was disclosed in October 2008 by Cimex Science. The device includes a carbon dioxide canister and a heating device to monitor the presence or absence of bedbugs.

Effective treatment for bedbug infestations are needed in the art, and this invention is believed to be an answer to that need.

SUMMARY OF THE INVENTION

In one aspect, the present invention is directed to an apparatus for monitoring or abatement of bedbugs, comprising: a base having a mounting portion and a control portion; a heating source positioned on the mounting portion; a first capture channel positioned proximate to the heating source and adjacent to a first side of the base and a second capture channel positioned proximate to the heating source and adjacent to a second side of the base, the first and second capture channels each comprising a sloped portion; a horizontal portion connected to the sloped portion, the horizontal portion having a width ranging from about 8 to about 15 millimeters; and a channel portion connected to the horizontal portion by a curved portion having a radius of curvature ranging from about $\frac{1}{8}^{th}$ inch to about $\frac{1}{2}$ inch; a carbon dioxide source attached to the base and capable of emitting carbon dioxide proximate to the heating source, and a control circuit mounted in the control portion and in communication with the heating source and the carbon dioxide source to control operation of the apparatus, wherein the control circuit controls emission of the carbon dioxide and wherein the control circuit controls the heating source to maintain a temperature ranging from 90 to 125° F.

In another aspect, the present invention is directed to an apparatus for monitoring or abatement of bedbugs, comprising: a base having a mounting portion and a control portion; a heating source positioned on the mounting portion; a first capture channel positioned proximate to the heating source and adjacent to a first side of the base and a second capture channel positioned proximate to the heating source and adjacent to a second side of the base, the first and second capture channels each comprising a sloped portion; a horizontal portion connected to the sloped portion, the horizontal portion having a width ranging from about 8 to about 15 millimeters; and a channel portion connected to the horizontal portion by a curved portion having a radius of curvature ranging from about $\frac{1}{8}^{th}$ inch to about ½ inch; an insect attractant source positioned on the heating source; a control circuit mounted in the control portion and in communication with the heating source to control operation of the apparatus, wherein the control circuit controls the heating source to maintain a temperature ranging from 90 to 125° F.

In another aspect, the present invention is directed to an apparatus for monitoring or abatement of bedbugs, comprising: a base having a mounting portion and a control portion; a heating source positioned on the mounting portion; a first capture channel positioned proximate to the heating source and adjacent to a first side of the base and a second capture channel positioned proximate to the heating source and adjacent to a second side of the base, the first and second capture channels each comprising a sloped portion; a horizontal portion connected to the sloped portion, the horizontal portion having a width ranging from about 8 to about 15 millimeters; and a channel portion connected to the horizontal portion by a curved portion having a radius of curvature ranging from about $\frac{1}{8}^{th}$ inch to about ½ inch; an insect attractant source positioned on the heating source; a carbon dioxide source attached to the base and capable of emitting carbon dioxide proximate to the heating source, and a control circuit mounted in the control portion and in communication with the heating source and the carbon dioxide source to control operation of the apparatus, wherein the control circuit controls emission of the carbon dioxide and wherein the control circuit controls the heating source to maintain a temperature ranging from 90 to 125° F.

In another aspect, the present invention is directed to a method of monitoring or abating bed infestations from a dwelling, comprising the steps of: providing an apparatus for abatement of bedbugs, comprising: a base having a mounting portion and a control portion; a heating source positioned on the mounting portion; a first capture channel positioned proximate to the heating source and adjacent to a first side of the base and a second capture channel positioned proximate to the heating source and adjacent to a second side of the base, the first and second capture channels each comprising a sloped portion; a horizontal portion connected to the sloped portion, the horizontal portion having a width ranging from about 8 to about 15 millimeters; and a channel portion connected to the horizontal portion by a curved portion having a radius of curvature ranging from about $\frac{1}{8}^{th}$ inch to about ½ inch; an insect attractant source positioned on the heating source; a carbon dioxide source attached to the base and capable of emitting carbon dioxide proximate to the heating source, and a control circuit mounted in the control portion and in communication with the heating source and the carbon dioxide source to control operation of the apparatus, wherein the control circuit controls emission of the carbon dioxide and wherein the control circuit controls the heating source to maintain a temperature ranging from 90 to 125° F.; installing the apparatus in a dwelling; and operating the apparatus for a time sufficient to abate the bed bug infestation.

These and other embodiments will be more fully understood when considered in conjunction with the accompanying drawings and following detailed description of the invention.

BRIEF DESCRIPTION OF THE DRAWINGS

The invention will be better understood when taken in conjunction with the following drawings in which.

DETAILED DESCRIPTION OF THE INVENTION

Figure 1:
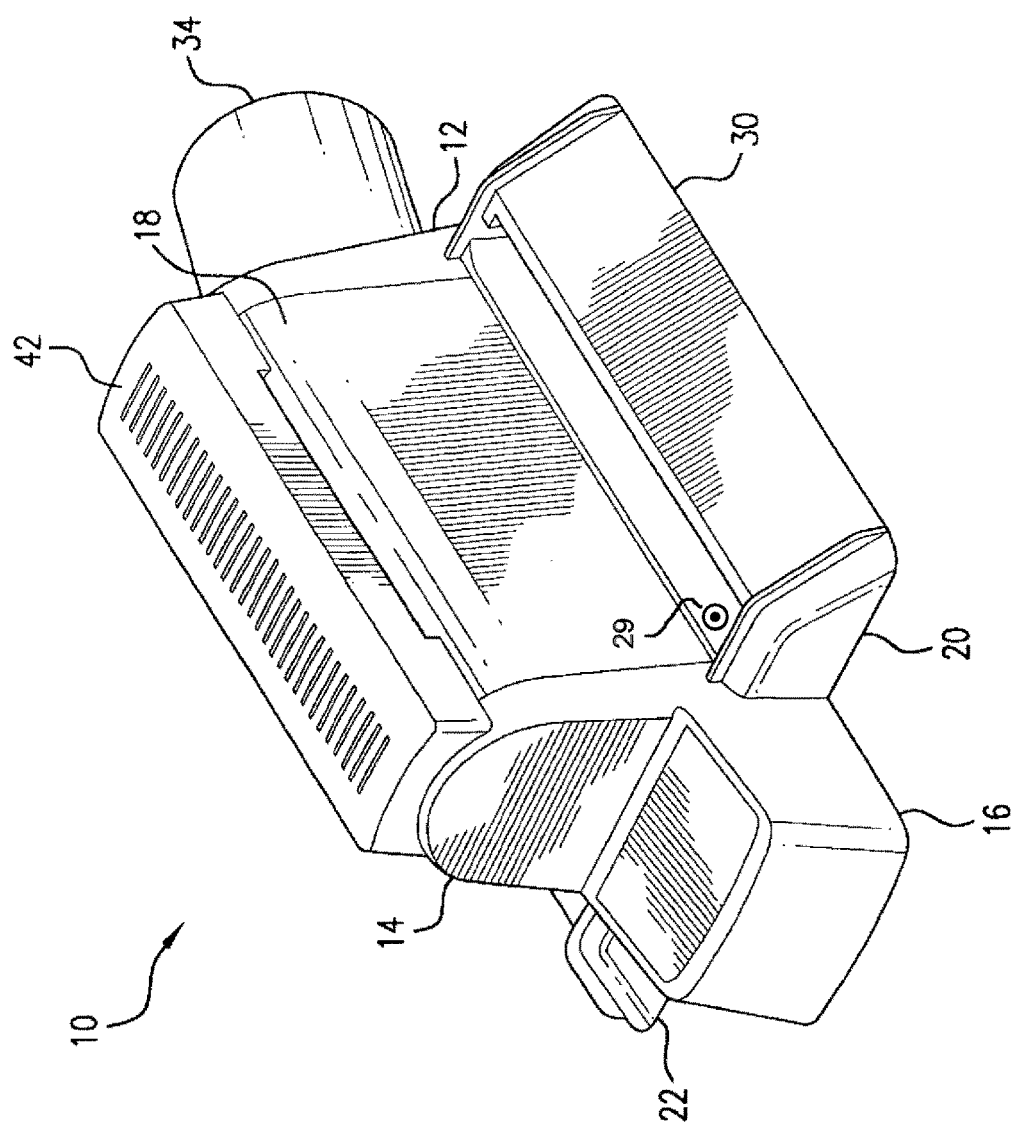
FIG. 1 is a schematic diagram of the apparatus of the invention.

The reappearance of bedbugs in North America has presented new challenges for pest control. Typical chemical treatments using conventional pesticides are expensive and require multiple applications of pesticide, yet are not completely effective for treating bedbug infestations. Barrier mechanisms, such as mattress covers, pillow covers, filling cracks, etc., are also not completely effective in preventing these insects from infesting a dwelling. This problem is particularly acute in hotels and residential housing structures where many people may reside. In these structures, bedbugs frequently migrate from room to room, causing infestations on a very large scale. This degree of infestation and the difficulty in removing such infestation can can cause a great deal of distress, and loss of business, particularly in the hospitality industry.

The inventors have unexpectedly discovered that a combination of thermal, chemical, and gaseous attractants is highly effective to cause bedbugs to migrate towards these substances. While not wishing to be bound by any particular theory, it is believed that the thermal, chemical and gaseous attractants act synergistically to provide an attraction mechanism that is greater and more effective than the attraction capability of each of the attractants taken individually. Based on this discovery, the present inventors have developed a device and method that attract, trap, and optionally kill bedbugs from any dwelling.

As indicated above, the present invention is directed to an apparatus for abatement of bedbugs. As defined herein, the term "abatement" means to reduce or eliminate the number of bedbugs in a defined space. The apparatus of the invention can be described and implemented in three embodiments: (1) an apparatus using carbon dioxide and heat as attractants; (2) an apparatus using chemical lures and heat as attractants; and (3) an apparatus using carbon dioxide, chemical lures, and heat as attractants. In its most basic form, the apparatus includes a base having a mounting portion and a control portion with a heating source positioned on the mounting portion. Two capture channels are positioned proximate to the heating source and adjacent to each of two sides of the base. Each capture channel is specifically designed with a sloped portion, a horizontal portion having a width of from about 8-15 millimeters, and a channel portion connected to the horizontal portion by a curved portion having a radius of curvature ranging from about $1/8^{th}$ inch to about $1/2$ inch. As explained in more detail below, the arrangement and dimensions of the capture channel are effective in trapping the bedbugs and preventing them from escaping. A carbon dioxide source and/or a chemical insect attractant source can be attached to the base so that carbon dioxide and/or chemical insect attractant is emitted proximate to the heating source. A control circuit is mounted in the control portion to control all aspects of the operation of the apparatus, as well to monitor the insects attracted to the apparatus and to communicate with the user via a wireless network. Each of these components is described in more detail below.

Figure 2:
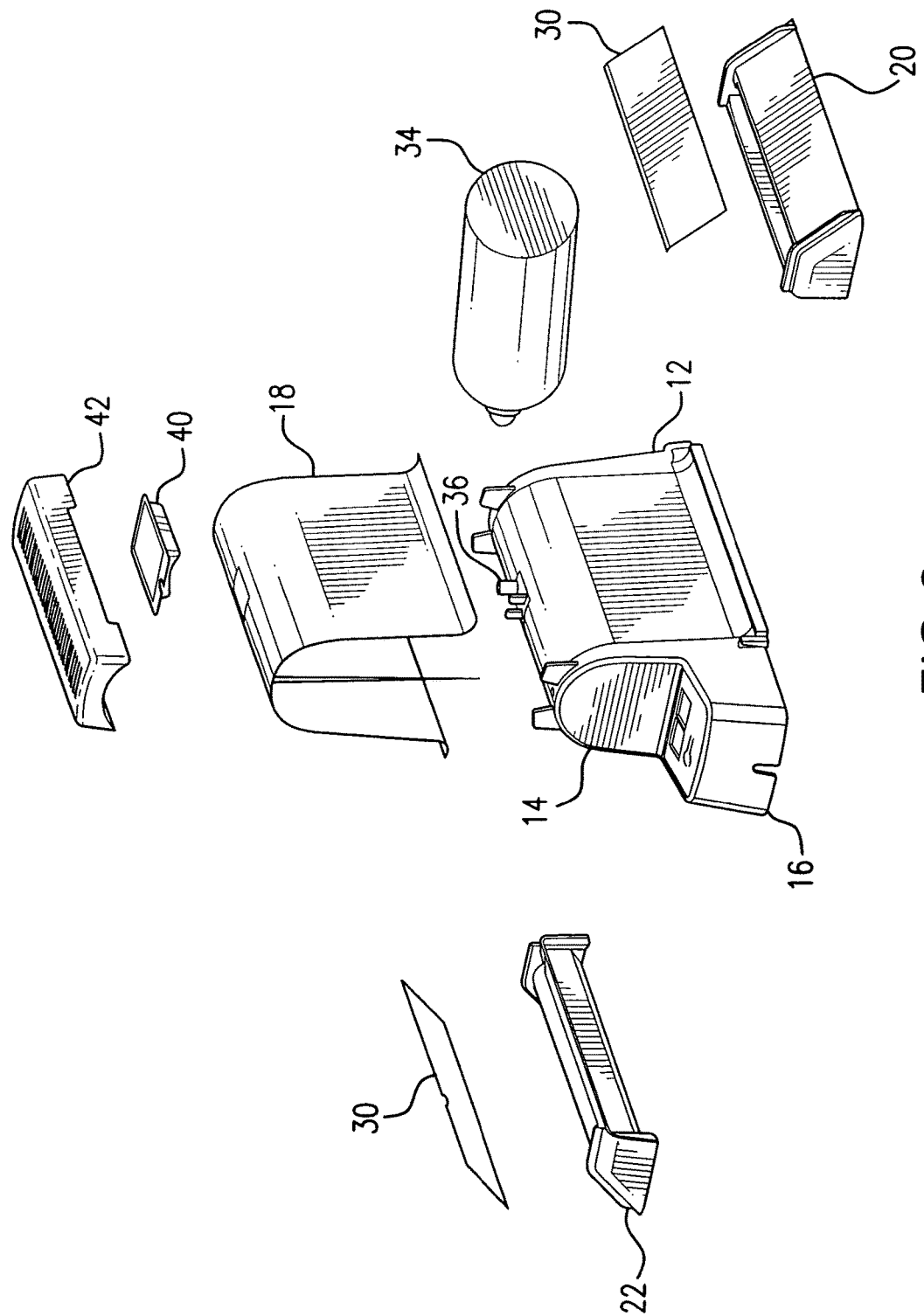
FIG. 2 is an exploded schematic diagram of the apparatus of the invention.

The apparatus of the present invention 10 is shown in FIG. 1, and FIG. 2 shows a general exploded view of the apparatus. As shown in FIGS. 1 and 2, the apparatus of the present invention 10 includes a base 12 that includes a mounting portion 14 and a control portion 16. The mounting portion 14 is sized and shaped to accommodate a gas canister (described below), while the control portion is sized to accommodate electronic control circuits and switches that operate the device. In general, the design of the apparatus of the invention has an open construction in order to prevent bedbugs from hiding inside the device and possibly being transported to other locations as the device is moved from place to place.

A heating source 18 is positioned on the mounting portion 14 of the base 12 to provide heat as an insect attractant. As shown in FIG. 1, the heating source 18 covers the top and sides of the mounting portion 14 of the base 12. The heating source can be any source of heat, e.g., electrical, chemical, and the like. In one embodiment, the heating source 18 is a thin electric heating element. The heating source 18 is preferably capable of generating heat in a temperature range of living organisms (e.g., a small animal). Preferably, the range of temperatures generated by the heating source is in the range of from about 90 to about 125° F., and more preferably in the range of about 95 to about 115° F. One useful temperature for the heating source is about 105° F. In an alternative embodiment, the heating source 18 contains a heating element arranged in a pattern resembling veins and arteries in order to more accurately mimic a living organism. In addition, to further enhance the insect-attracting capabilities of the invention, it is preferable that the heating source generate eddy currents of heat in the air that resemble the eddy currents of heat generated by a small animal. In order to more closely mimic a living organism, it is preferable that the heating element emit nonuniformities in the temperature distribution at the surface of the heating element.

Figure 3:
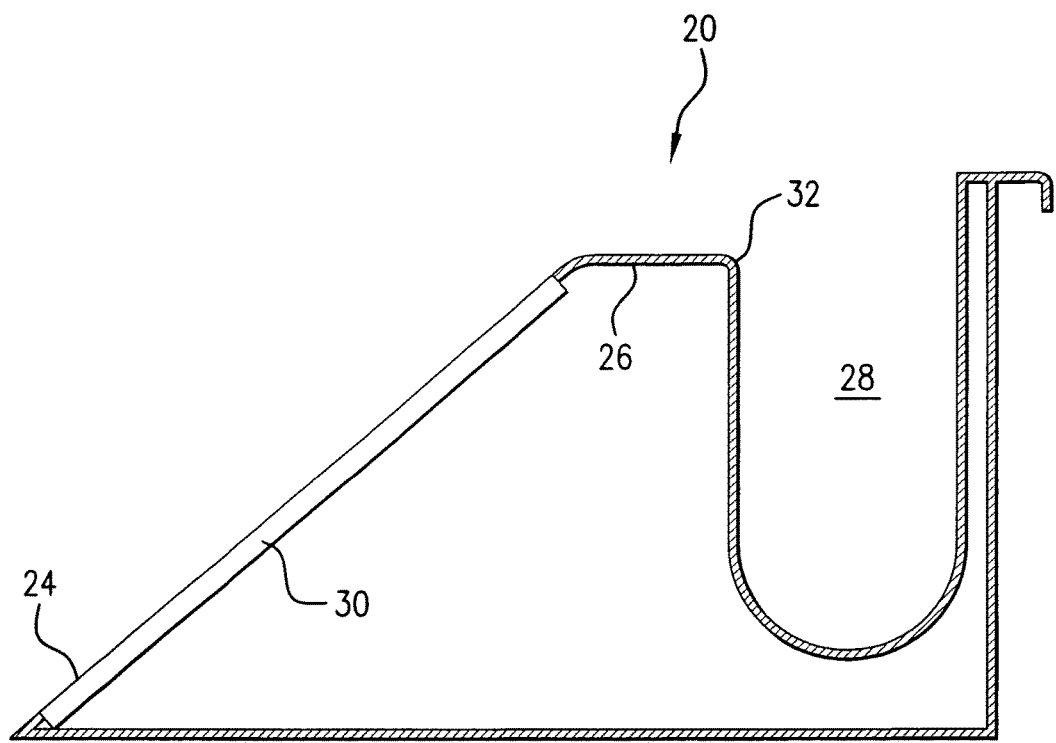
FIG. 3 is a schematic diagram of the capture channel portion of the base of the present invention.

Two capture channels 20,22 are positioned adjacent to each side of the mounting portion 14 of the base 12 and proximate to the heating source 18. A schematic drawing of one of the capture channels 20 is shown in FIG. 3. The capture channel 20 includes a sloped portion 24, a horizontal portion 26, and a channel portion 28. Each of these elements is designed to efficiently and effectively trap bedbugs as they are attracted to the device.

The sloped portion 24 of the capture channel 20 is sloped at an angle ranging from about 5 to about 90 degrees, more preferably from about 20 to about 75 degrees, and preferably about 30 degrees. The sloped portion preferably includes a texture that makes it easy for the bedbugs to traverse the length of the sloped portion of the capture channel. Such texturing may be the result of the manufacturing process, including molded texture or applying a finish with a rough texture. Alternatively, a material 30 such as felt, cloth, or unfinished wood may be applied to the sloped portion. The horizontal portion 26 allows the traversing bedbugs to move off the textured sloped portion so that they may more easily fall into the channel portion 28. The horizontal portion is wider than the length of a bedbug (about 2 mm) and preferably from about 8 to about 15 millimeters in width. In a preferred embodiment, the horizontal portion has a width of about 6 mm. Additionally, the horizontal portion preferably has a smooth, low-friction finish so that the bedbugs may easily fall into the channel portion 28. The smooth finish may be provided during the manufacturing process with a smooth material, or the horizontal portion may be separately finished with a low-friction coating. The interface between the horizontal portion 26 and the channel portion 28 is a curved portion 32 having a defined radius of curvature. The radius of this curved portion 32 can be any radius that inconspicuously permits the bedbugs to walk and fall into the channel portion 28. Preferably, the radius of curvature of the curved portion 32 ranges from about $1/8^{th}$ inch to about $1/2$ inch, and is preferably about $1/4$ inch. Like the horizontal portion, the curved portion 32 may also have a smooth finish in order to promote bedbugs to fall into the capture channel. The channel portion 28 are preferably vertical or nearly vertical, and manufactured with a very smooth surface so that once the insects have migrated into the capture channel, they cannot escape by crawling back out.

The design of the capture channels 20,22 provides several advantages to the present invention. First, bed bugs are known to emit an "alarm pheromone" when in trouble which keeps other bed bugs away, so one must capture them without alarming them. The capture channels 20,22 are advantageous for this purpose, and gives the bed bugs a protected place to congregate, which they also like to do. Second, bed bugs are equipped with an "aggregation pheromone" to signal when they have found a secure refuge or a good blood source. To make the capture channels as attractive as possible to bedbugs, the horizontal portion 26 provides a gap wide enough to allow the bed bugs to fall in to the channel portion 28. The bottom of the channel portion 28 is preferably dark and narrow, giving the bed bugs a secluded place to congregate. A partial covering of the capture channel may be used to prevent a direct line of sight to bed bugs in the bottom of the channel so that the user or a hotel guest is not offended by the sight of dead insects.

The apparatus of the invention may also include a source of carbon dioxide gas to further enhance the insect-attracting properties of the invention. The source of carbon dioxide may be any source, but is preferably a tank containing compressed $CO_2$ 34 as shown in FIGS. 1 and 2. The carbon dioxide source preferably emits $CO_2$ via an outlet 36 positioned proximate to the heating source (e.g., above or off to the side). An emitting tube (not shown) may be attached to the outlet 36 to better disperse the carbon dioxide gas while the device is operating. The emitting tube may be placed directly on the heating source (preferably in the center), or may be elevated from the heating source. Preferably, if the emitter is elevated, it is 18 inches or less from the surface of the heating source, more preferably 2 inches or less, and most preferably, $1/2$ inch or less. The emitting tube is preferably a porous material that quiets (muffles) the output of carbon dioxide and also permits it to escape in a pulsed or sinusoidal manner without allowing the output to stop or cease. This method of emission is preferable in order to more closely mimic the breathing pattern of an animal. Preferably, carbon dioxide is emitted in a sinusoidal or pulsed fashion with a 1 to 10 second interval, and more preferably with a 5 second interval.

Figure 4:
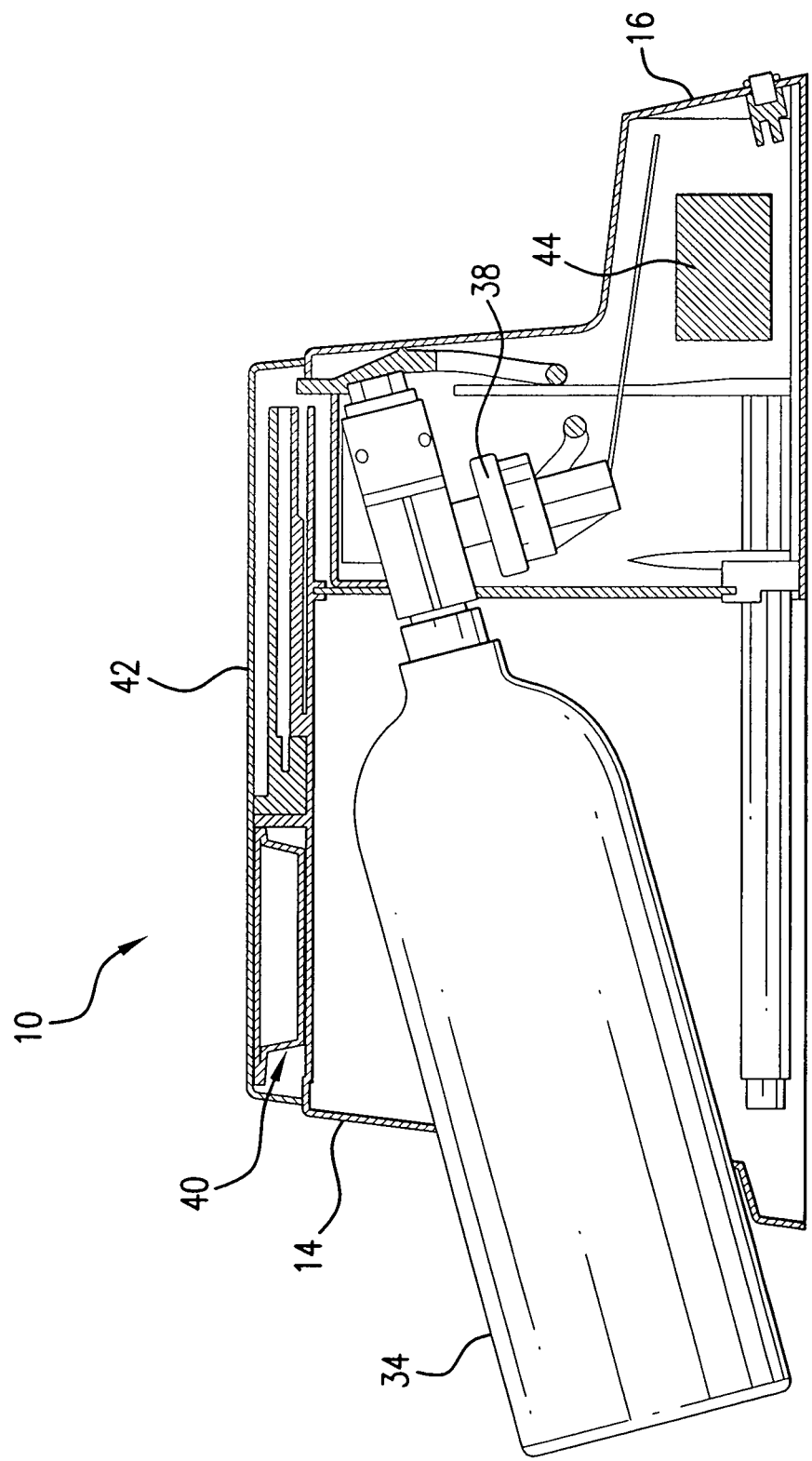
FIG. 4 is a side cutaway view of the apparatus of the invention.

As shown in FIG. 4 where like numerals refer to like parts, the carbon dioxide source 34 preferably contains a valve 38 that is in electrical communication with a controller (discussed in more detail below) such that carbon dioxide is emitted in a controlled fashion. In one embodiment, carbon dioxide is emitted at a rate ranging from 20 to 400 cubic centimeters (cc) of $CO_2$ per minute, and preferably from about 50 to about 200 cc of $CO_2$ per minute. The emission of carbon dioxide can be continuous or noncontinuous. In a noncontinuous embodiment, the carbon dioxide is emitted from 1 to about 12 hours, more preferably from about 2 to about 10 hours, and most preferably from about 5 to about 8 hours. In another embodiment, the emission of carbon dioxide is continuous, and the amount of $CO_2$ emitted ranges from 50 to 1000 cc per minute.

To further enhance the insect attracting capabilities of the invention, chemical attractants may also be included in the apparatus of the invention. The chemical attractant can take any form, for example, liquid, solid, gel, or gas. In one embodiment, the attractant or combination of attractants is included in a strip 40 that is attached to the heating source 18 in order to more easily volatilize these materials. A cover 42 containing slots covers the strip 40 and outlet 36 and permits the volatile chemicals to escape. While any chemical insect attractant may be used in the apparatus of the invention, preferred chemical attractants include kairomones, which are chemicals given off by blood hosts. Examples of such kairomones include carbon dioxide exhaled by both mammalian and avian blood hosts, and octenol, an alcohol which is given off by mammalian blood hosts. Other examples of kairomones include lactic acid, propionic acid, butyric acid, valeric acid, caproic acid, ammonia, acetone, as well as combinations of these. (See also Barrozo and Lazzari, *Chem. Senses* 29:833-841 (2004) and Barrozo and Lazzari, *Chem. Senses* 29:319-329 (2004), both incorporated by reference herein). In one embodiment, a chemical attractant comprising about 6.6 wt % lactic acid and 6.6 wt % octenol in a gel (Agilex Inc., Piscataway, N.J.) can be sued. A mixture of carbon dioxide and octenol is particularly attractive to insects seeking mammalian blood hosts.

A control circuit 44 is attached to the inside of the control portion 16 of the base 12 and is in electrical communication with the various components of the device, including the heating source 18 and carbon dioxide source 34. The control circuit 44 acts as the control center of the device so that all the components perform within the parameters outlined above. As would be appreciated by one skilled in the art, the controller can include monitoring, timing, and controlling software that permit effective operation of the device. In one embodiment, the controller is controllable to allow the user to program the device to automatically operate at a time when the bedbugs are most active (e.g., night). The controller may also include wireless activation and control circuits known in the art in order to allow personnel to remotely control and monitor the device from a central location. Preferably, the controller is sealed in order to prevent bedbugs from entering this component. The control circuit, as well as all the components of the apparatus, are powered by conventional power sources (AC outlets, batteries, and the like).

Additional components may be added to the capture channel and used with the controller in order to monitor the performance and results of the device. In one embodiment, a small camera 29 may be positioned inside the capture channel in order to visually detect the presence of bedbugs. Used in conjunction with pattern recognition software and wireless communications, it is possible for the device to quantitate the number insects that are captured in the channel and report those results to the user at a remote location. In another embodiment, a pressure-sensitive strip may be added to the bottom of the channel in order to measure the total weight of the insects in the channel. Appropriate software and wireless communications can quantitate the number of insects in the channel and wirelessly report those monitoring results to the user.

The apparatus of the invention may be used in any dwelling, including single-family or multi-family homes, apartments, condominiums, multi-unit dwellings, hotels, motels, bed and breakfast dwellings, hostels, cruise ships, university housing, nursing homes, shelters, barracks, and camp dwellings, and the like. In use, the apparatus of the invention is placed inside a room suspected of containing bedbugs. Preferably, multiple apparatuses are placed in the room, and more preferably surrounding a bed. In one embodiment, three devices are placed in a bedroom. One device is placed on two sides of the bed, and one device is placed at the foot of the bed. The apparatus of the invention is operated from about 1 to 30 days to monitor the bedbugs, or until the presence of bedbugs is abated or eliminated.

As would be appreciated by one skilled in the art, the device of the present invention may be used in conjunction with other known insect abatement techniques. Such known techniques include, without limitation, treating the bedding material with chemical or steam; isolating the bedding materials with protective barriers, bags, encasements and the like; and preventing access to the bed by isolating the legs of the bed from coming into contact with the offending insects. The latter technique has been a known "home remedy" for many years, and is usually implemented by placing each leg of the bed in a saucer or can containing water, kerosene, mineral oil, and the like.

EXAMPLES

The following examples are intended to illustrate, but in no way limit, the present invention.

Example 1: Effectiveness of Bed Bug Lures on Attracting Bed Bugs (Lure and Heat)

A one-bedroom apartment containing about 1,000 to 2,000 bed bugs was used for this example. Three of the apparatus described above were placed in the bedroom (one on each side of the bed and another at the foot of the bed). Each of the apparatuses contained either (1) no chemical attractant, (2) octenol as a chemical attractant; or (3) octenol and lactic acid as a chemical attractant. None of the devices included carbon dioxide as an attractant. The apparatuses were operated from 12 AM to 6 AM for 1-12 days. The trap locations were rotated after periodic checks. The number of bed bugs trapped was determined each day. The results are shown in FIG. 4.

As shown in FIG. 4, the number of cumulative trap catches increases over time. An apparatus using heat plus a combination of octenol and lactic acid chemical attractants shows the largest amount of insect catches over the analyzed time period.

Example 2: Effectiveness of Bed Bug Lures on Attracting Bed Bugs (Lure and Heat)

A one-bedroom apartment containing more than 1,000 bed bugs was used for this example. Apparatuses described as in Example 1 were prepared as follows:

| Apparatus | Attractants |
|---|---|
| 1 | Control (no heat or chemicals) |
| 2 | Heat alone |
| 3 | Heat plus octenol |
| 4 | Heat plus octenol plus lactic acid |
| 5 | Heat plus octenol plus lactic acid plus propionic acid plus butyric acid plus valeric acid. |

A control apparatus and one of apparatus 2, 3, 4, or 5 was installed in the bedroom on opposite sides of the bed. No carbon dioxide was used as an attractant in this example. The apparatuses were operated from 12 AM to 5 AM for 2 days. The trap locations were rotated after periodic checks. The number of bed bugs trapped was determined each day. The results are shown in FIG. 5.

Figure 5:
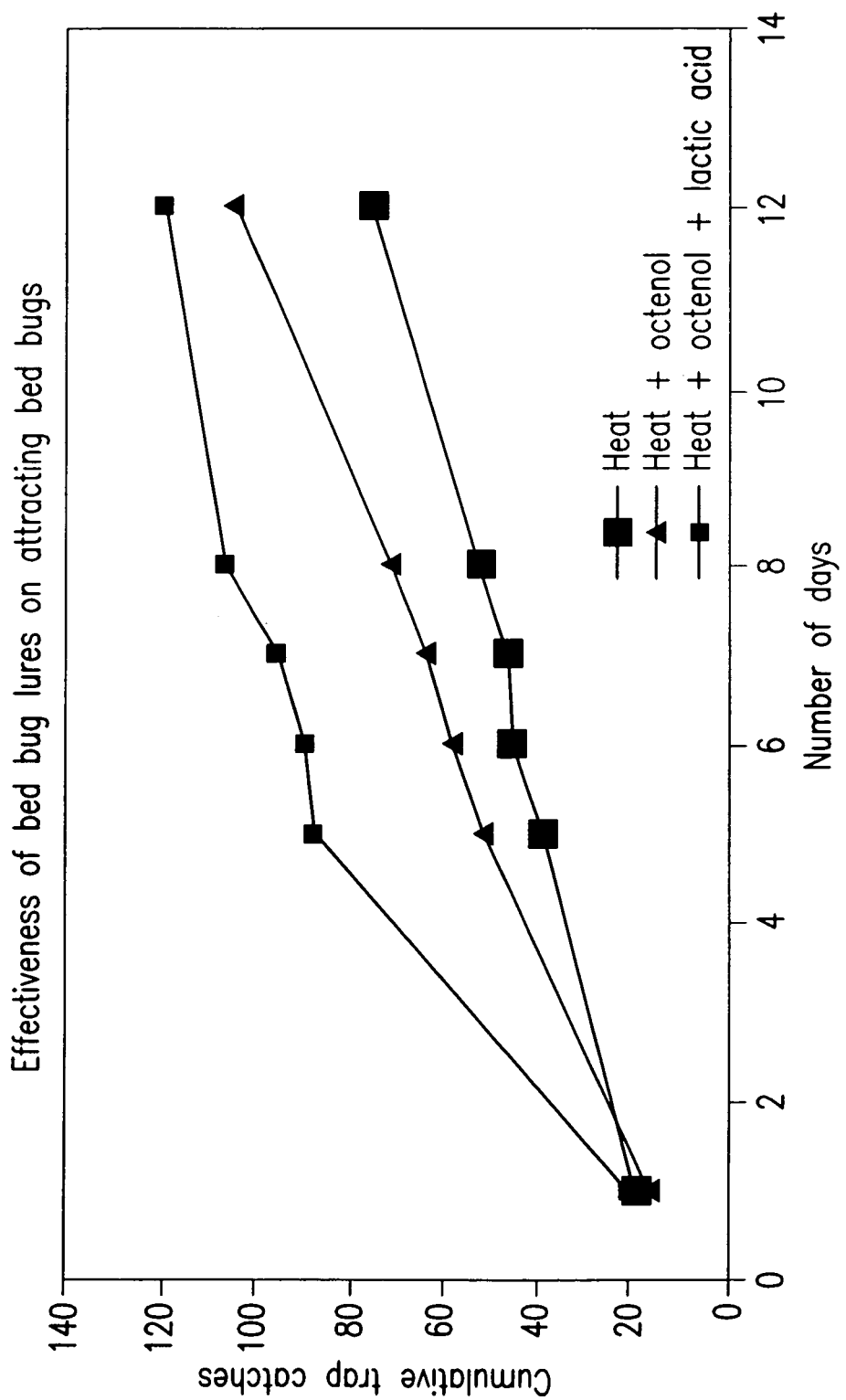
FIG. 5 is a graph showing cumulative trap catches of bed bugs versus time for selected apparatuses of the invention.

As shown in FIG. 5, the mean trap count for each of the experimental apparatuses shows significantly larger number of trapped bedbugs as compared to the control.

Example 3: Effectiveness of Bed Bug Lures on Attracting Bed Bugs (Lure, Heat, and Carbon Dioxide)

Conditions similar to Example 1 were used for this Example, but carbon dioxide was also included as an attractant. Following the experiments, counts of adult and juvenile bed bugs were determined. The results are shown in FIGS. 6 and 7.

Figure 6:
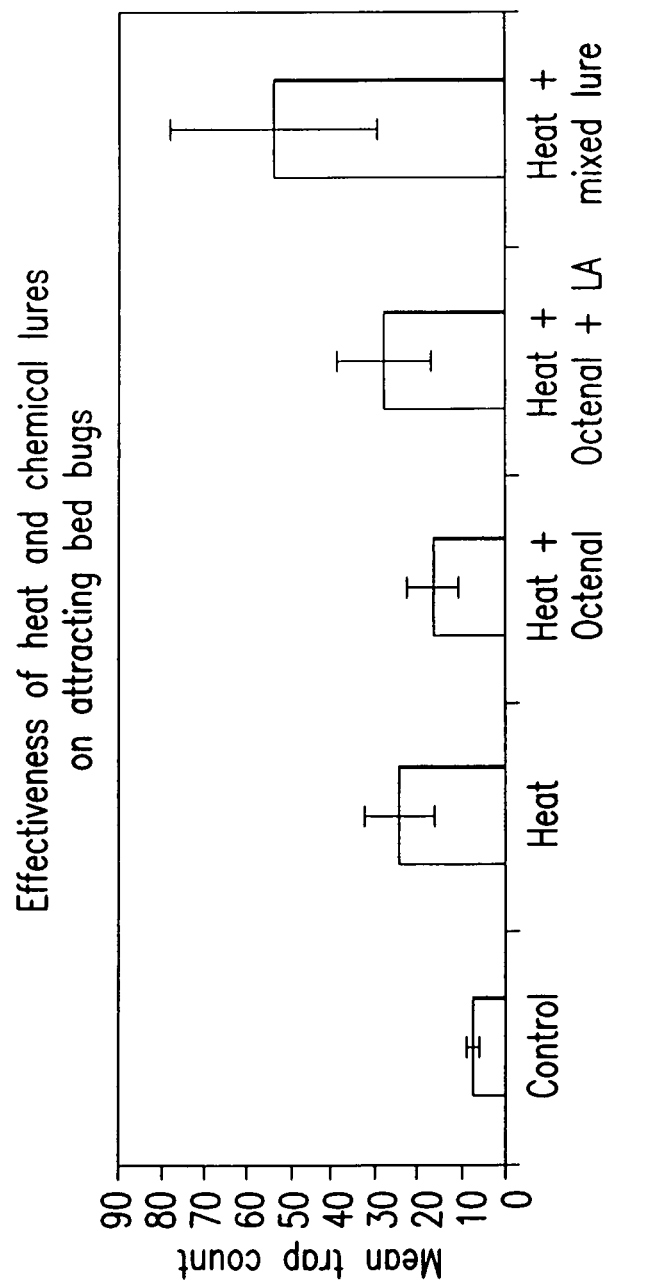
FIG. 6 is a graph showing mean trap count versus several combinations of attractants in the apparatus of the invention.
Figure 7:
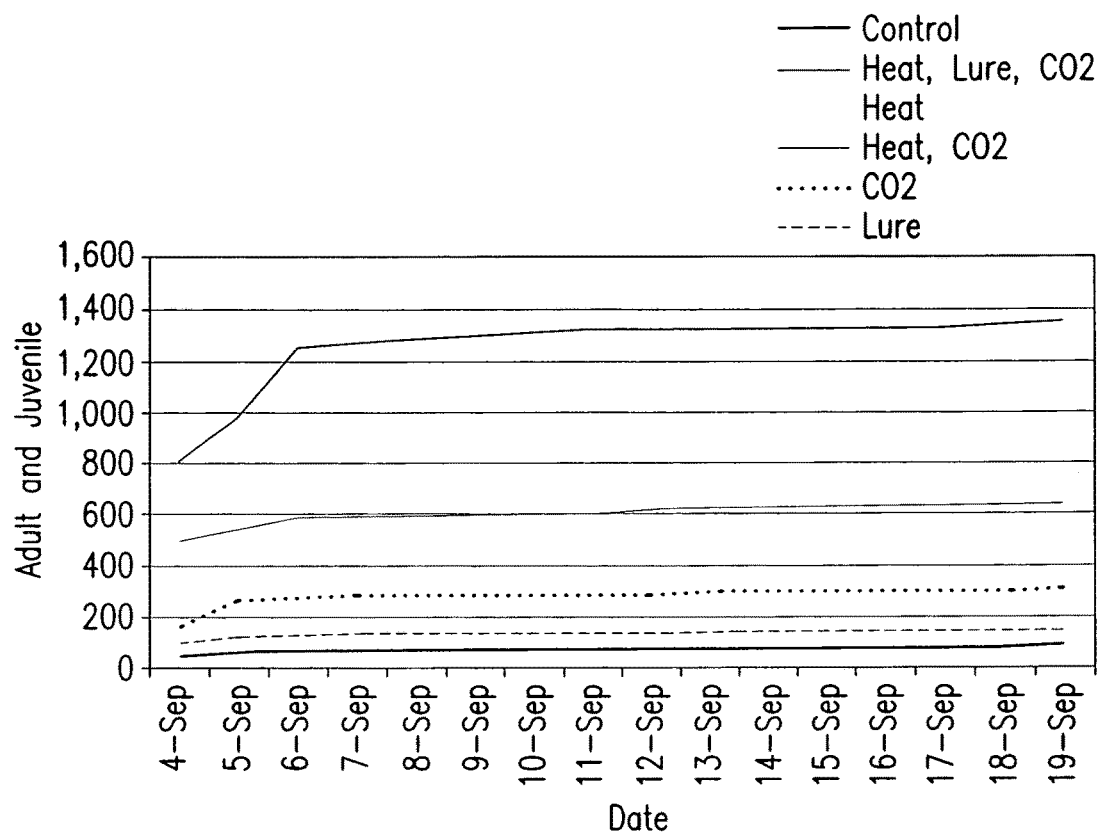
FIG. 7 is a graph showing the number of trapped bedbugs over time with respect to various combinations of heat, chemical lures, and carbon dioxide in the apparatus of the invention.
Figure 8:
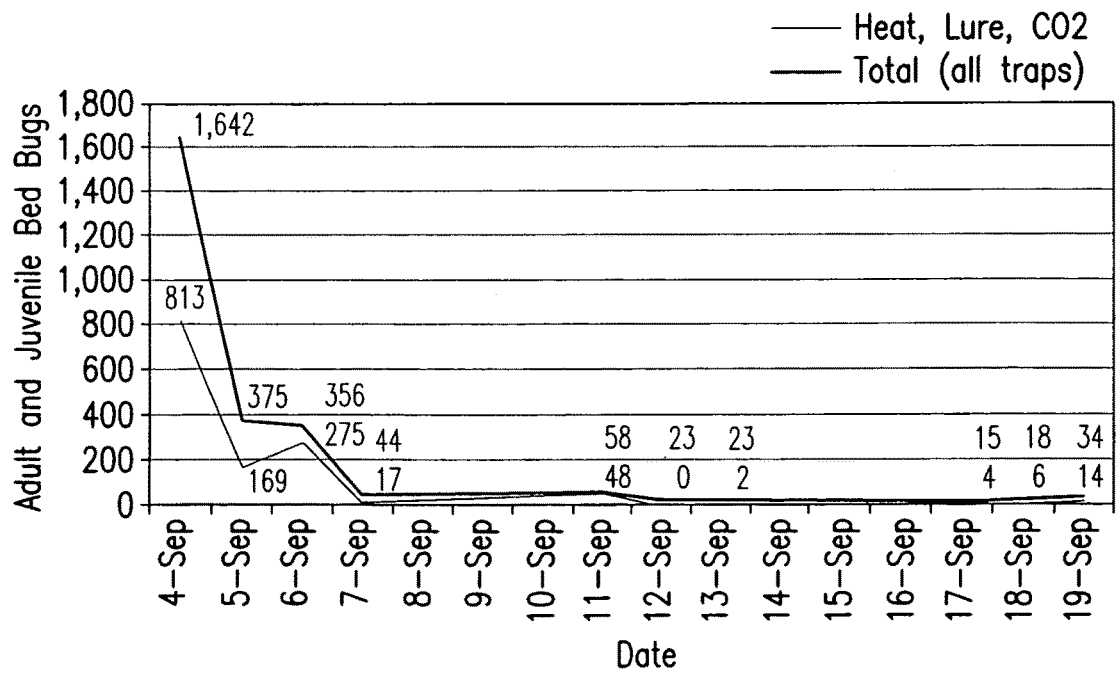
FIG. 8 is a graph showing the number of trapped bedbugs over time using the apparatus of the invention.

As shown in FIG. 6, a combination of heat, chemical attractant, and carbon dioxide was significantly more effective in trapping bedbugs than was heat and carbon dioxide alone. As shown in FIG. 7, using a combination of heat, chemical attractant and carbon dioxide, the number of trapped bed bugs was reduced significantly over the first four days of the experiment. The following days show many fewer traps, suggesting that the entire bedbug population in the structure was significantly decreased.

Example 4: Effectiveness of Bed Bug Lures on Attracting Bed Bugs (Lure, Heat, and Carbon Dioxide)

An apparatus described in Example 1 was used to collect bedbugs. The apparatus was amended with $CO_2$ (released at the rate of 30 liters/h), heat (temperatures on the thermal lure ranged from 99° F. to 108° F.), and a chemical lure comprised of proprionic acid, 33.0 µg; butyric acid, 0.33 µg; valeric acid, 0.33 µg; octenol, 100 µg; and L-lactic acid, 100 µg impregnated into a gel. Trapping was conducted in a naturally infested apartment after the tenant was relocated and all furniture was removed. Traps with heat and with or without the chemical lure were tested without $CO_2$ on 29 trap-days and with $CO_2$ on 9 trap-days. The numbers of bed bugs captured were 656 and 5,898 in traps without $CO_2$ and with $CO_2$, respectively.

Figure 9:
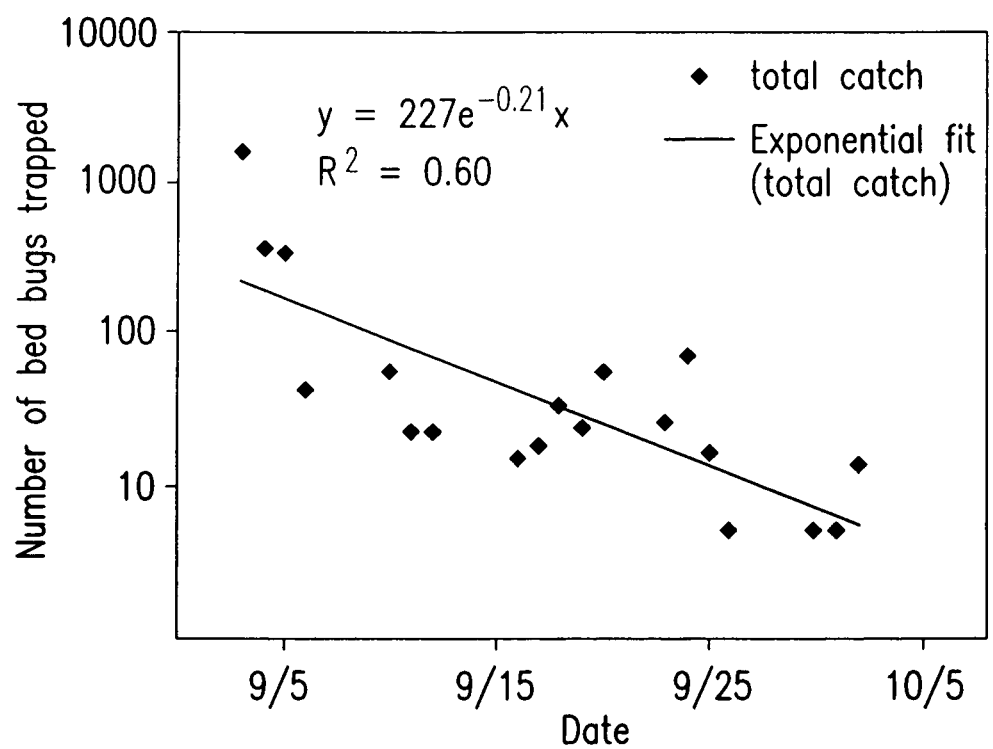
FIG. 9 is a graph showing exponential decline of numbers of captured bedbugs versus time in a naturally infested apartment using the apparatus of the invention.

The numbers of bed bugs of all feeding stages captured were significantly greater in traps with $CO_2$ ($\chi^2=15,942$, df=1, P<0.001) (See Table 1). A nonparametric two-way analysis of variance evaluation of six different traps with our without $CO_2$, heat, or chemical lure over an additional 19 trap-days showed that trap type was highly significant (n=2,833 bed bugs collected) ($p<10^{-7}$). The trap with $CO_2$, heat, and chemical lure captured more bed bugs than the other traps, but only caught significantly more fourth and fifth instar nymphs than all other traps. Otherwise, the catches in this trap were not significantly different from the trap that contained $CO_2$ and heat only. The total numbers of bed bugs collected for each trapping date (pooling all 6 traps) followed an exponential decline over the trapping period (FIG. 9).

TABLE 1

| | Trap Type | | | |
|---|---|---|---|---|
| Trap No. | $CO_2$ | Heat | Lure | No. Bedbugs Collected |
| 1 | X[1] | X | X | 1476 |
| 2 | X | X | ○ | 668 |
| 3 | X | ○ | ○ | 336 |
| 4 | ○ | ○ | X | 179 |
| 5 | ○ | X | ○ | 80 |
| 6 | ○ | ○ | ○ | 94 |
| | | | | Total: 2833 |

[1]X = Present; ○ = Absent

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for monitoring or abatement of bedbugs, comprising:
   a base having a mounting portion and a control portion;
   a heating source positioned on said mounting portion;
   a first capture channel positioned proximate to said heating source and adjacent to a first side of said base and a second capture channel positioned proximate to said heating source and adjacent to a second side of said base, said first and second capture channels each comprising
   a sloped portion;
   a horizontal portion connected to said sloped portion, said horizontal portion having a width ranging from about 8 to about 15 millimeters; and
   a channel portion connected to said horizontal portion by a curved portion having a radius of curvature ranging from about $\frac{1}{8}^{th}$ inch to about ½ inch;
   an insect attractant source positioned on said heating source; and
   a control circuit mounted in said control portion and in communication with said heating source to control operation of said apparatus, wherein said control circuit controls said heating source.

2. The apparatus of claim 1, wherein said heating source comprises a heating element disposed in a pattern resembling veins and arteries.

3. The apparatus of claim 1, wherein said heating source maintains a temperature ranging from about 90 to 125° F.

4. The apparatus of claim 1, wherein said insect attractant source is selected from the group consisting of octenol, lactic acid, propionic acid, butyric acid, valeric acid, caproic acid, ammonia, acetone, and combinations thereof.

5. The apparatus of claim 1, wherein said first capture channel further comprises a detection device capable of quantitating the number of bedbugs captured in said channel portion, said detection device positioned inside said channel portion and selected from the group consisting of cameras and weight-sensitive strips.

6. The apparatus of claim 1, wherein said second capture channel further comprises a detection device capable of quantitating the number of bedbugs captured in said channel portion, said detection device positioned inside said channel portion and selected from the group consisting of cameras and weight-sensitive strips.

7. The apparatus of claim 1, wherein said control circuit is programmable such that said apparatus operates during a predetermined time of day.

8. The apparatus of claim 1, wherein said control circuit is in wireless communication with a user at a remote location.

9. An apparatus for monitoring or abatement of bedbugs, comprising:
   a base having a mounting portion and a control portion;
   a heating source positioned on said mounting portion;
   a first capture channel positioned proximate to said heating source and adjacent to a first side of said base and a second capture channel positioned proximate to said heating source and adjacent to a second side of said base, said first and second capture channels each comprising
   a sloped portion;
   a horizontal portion connected to said sloped portion, said horizontal portion having a width ranging from about 8 to about 15 millimeters; and
   a channel portion connected to said horizontal portion by a curved portion having a radius of curvature ranging from about $\frac{1}{8}^{th}$ inch to about ½ inch;
   a carbon dioxide source attached to said base and capable of emitting carbon dioxide proximate to said heating source; and
   a control circuit mounted in said control portion and in communication with said heating source and said carbon dioxide source to control operation of said apparatus, wherein said control circuit controls emission of said carbon dioxide and wherein said control circuit controls said heating source.

10. The apparatus of claim 9, wherein said heating source comprises a heating element disposed in a pattern resembling veins and arteries.

11. The apparatus of claim 9, wherein said heating source maintains a temperature ranging from about 90 to 125° F.

12. The apparatus of claim 9, wherein said carbon dioxide is emitted at a rate ranging from 20 to 400 cubic centimeters (cc) of $CO_2$ per minute, and for a time ranging from 1 hour to 12 hours.

13. The apparatus of claim 9, wherein said carbon dioxide is emitted at a rate ranging from 50 to 200 cubic centimeters (cc) of $CO_2$ per minute, and for a time ranging from 2 hour to 10 hours.

14. The apparatus of claim 9, wherein said carbon dioxide is emitted continuously at a rate ranging from 50 to 1000 cc per minute.

15. The apparatus of claim 9, wherein said first capture channel further comprises a detection device capable of quantitating the number of bedbugs captured in said channel portion, said detection device positioned inside said channel portion and selected from the group consisting of cameras and weight-sensitive strips.

16. The apparatus of claim 9, wherein said second capture channel further comprises a detection device capable of quantitating the number of bedbugs captured in said channel portion, said detection device positioned inside said channel portion and selected from the group consisting of cameras and weight-sensitive strips.

17. The apparatus of claim 9, wherein said control circuit is programmable such that said apparatus operates during a predetermined time of day.

18. The apparatus of claim 9, wherein said control circuit is in wireless communication with a user at a remote location.

19. An apparatus for monitoring or abatement of bedbugs, comprising:
   a base having a mounting portion and a control portion;
   a heating source positioned on said mounting portion;
   a first capture channel positioned proximate to said heating source and adjacent to a first side of said base and a second capture channel positioned proximate to said heating source and adjacent to a second side of said base, said first and second capture channels each comprising
   a sloped portion;
   a horizontal portion connected to said sloped portion, said horizontal portion having a width ranging from about 8 to about 15 millimeters; and
   a channel portion connected to said horizontal portion by a curved portion having a radius of curvature ranging from about $\frac{1}{8}^{th}$ inch to about ½ inch;
   an insect attractant source positioned on said heating source;
   a carbon dioxide source attached to said base and capable of emitting carbon dioxide proximate to said heating source; and
   a control circuit mounted in said control portion and in communication with said heating source and said carbon dioxide source to control operation of said apparatus, wherein said control circuit controls emission of said carbon dioxide and wherein said control circuit controls said heating source.

20. The apparatus of claim 19, wherein said heating source comprises a heating element disposed in a pattern resembling veins and arteries.

21. The apparatus of claim 19, wherein said heating source maintains a temperature ranging from about 90 to 125° F.

22. The apparatus of claim 19, wherein said insect attractant source is selected from the group consisting of octenol, lactic acid, propionic acid, butyric acid, valeric acid, caproic acid, ammonia, acetone, and combinations thereof.

23. The apparatus of claim 19, wherein said carbon dioxide is emitted at a rate ranging from 20 to 400 cubic centimeters (cc) of $CO_2$ per minute, and for a time ranging from 1 hour to 12 hours.

24. The apparatus of claim 19, wherein said carbon dioxide is emitted at a rate ranging from 50 to 200 cubic centimeters (cc) of $CO_2$ per minute, and for a time ranging from 2 hour to 10 hours.

25. The apparatus of claim 19, wherein said carbon dioxide is emitted continuously at a rate ranging from 50 to 1000 cc per minute.

26. The apparatus of claim 19, wherein said first capture channel further comprises a detection device capable of quantitating the number of bedbugs captured in said channel portion, said detection device positioned inside said channel portion and selected from the group consisting of cameras and weight-sensitive strips.

27. The apparatus of claim 19, wherein said second capture channel further comprises a detection device capable of quantitating the number of bedbugs captured in said channel portion, said detection device positioned inside said channel portion and selected from the group consisting of cameras and weight-sensitive strips.

28. The apparatus of claim 19, wherein said control circuit is programmable such that said apparatus operates during a predetermined time of day.

29. The apparatus of claim 19, wherein said control circuit is in wireless communication with a user at a remote location.

30. A method of monitoring or abating bedbug infestation from a dwelling, comprising the steps of:
providing an apparatus for abatement of bedbugs, comprising:
a base having a mounting portion and a control portion;
a heating source positioned on said mounting portion;
a first capture channel positioned proximate to said heating source and adjacent to a first side of said base and a second capture channel positioned proximate to said heating source and adjacent to a second side of said base, said first and second capture channels each comprising
a sloped portion;
a horizontal portion connected to said sloped portion, said horizontal portion having a width ranging from about 8 to about 15 millimeters; and
a channel portion connected to said horizontal portion by a curved portion having a radius of curvature ranging from about ⅛$^{th}$ inch to about ½ inch;
an insect attractant source positioned on said heating source;
a carbon dioxide source attached to said base and capable of emitting carbon dioxide proximate to said heating source; and
a control circuit mounted in said control portion and in communication with said heating source and said carbon dioxide source to control operation of said apparatus, wherein said control circuit controls emission of said carbon dioxide and wherein said control circuit controls said heating source;
installing said apparatus in a dwelling; and
operating said apparatus for a time sufficient to abate said bedbug infestation.

31. The method of claim 30, wherein said heating source comprises a heating element disposed in a pattern resembling veins and arteries.

32. The method of claim 30, wherein said heating source maintains a temperature ranging from about 90 to 125° F.

33. The method of claim 30, wherein said insect attractant source is selected from the group consisting of octenol, lactic acid, propionic acid, butyric acid, valeric acid, caproic acid, ammonia, acetone, and combinations thereof.

34. The method of claim 30, wherein said carbon dioxide is emitted at a rate ranging from 20 to 400 cubic centimeters (cc) of $CO_2$ per minute, and for a time ranging from 1 hour to 12 hours.

35. The method of claim 30, wherein said carbon dioxide is emitted at a rate ranging from 50 to 200 cubic centimeters (cc) of $CO_2$ per minute, and for a time ranging from 2 hour to 10 hours.

36. The method of claim 30, wherein said carbon dioxide is emitted continuously at a rate ranging from 50 to 1000 cc per minute.

37. The method of claim 30, wherein said first capture channel further comprises a detection device capable of quantitating the number of bedbugs captured in said channel portion, said detection device positioned inside said channel portion and selected from the group consisting of cameras and weight-sensitive strips.

38. The method of claim 30, wherein said second capture channel further comprises a detection device capable of quantitating the number of bedbugs captured in said channel portion, said detection device positioned inside said channel portion and selected from the group consisting of cameras and weight-sensitive strips.

39. The method of claim 30, wherein said control circuit is programmable such that said apparatus operates during a predetermined time of day.

40. The method of claim 30, wherein said control circuit is in wireless communication with a user at a remote location.

41. The method of claim 30, wherein said time from about 1 to 30 days.

* * * * *